(12) United States Patent
Sezaki

(10) Patent No.: US 10,899,002 B2
(45) Date of Patent: Jan. 26, 2021

(54) ARTICLE MOVEMENT APPARATUS, ARTICLE MOVEMENT METHOD, AND ARTICLE MOVEMENT CONTROL PROGRAM

(71) Applicants: KABUSHIKI KAISHA TOSHIBA, Tokyo (JP); Toshiba Infrastructure Systems & Solutions Corporation, Kanagawa (JP)

(72) Inventor: Kentaro Sezaki, Kawasaki Kanagawa (JP)

(73) Assignees: KABUSHIKI KAISHA TOSHIBA, Tokyo (JP); TOSHIBA INFRASTRUCTURE SYSTEMS & SOLUTIONS CORP., Kanagawa (JP)

( * ) Notice: Subject to any disclaimer, the term of this patent is extended or adjusted under 35 U.S.C. 154(b) by 218 days.

(21) Appl. No.: 16/110,563

(22) Filed: Aug. 23, 2018

(65) Prior Publication Data
US 2019/0077011 A1    Mar. 14, 2019

(30) Foreign Application Priority Data

Sep. 12, 2017    (JP) .................................. 2017-175103

(51) Int. Cl.
| G06F 7/00 | (2006.01) |
| B25J 9/00 | (2006.01) |
| B25J 15/00 | (2006.01) |
| B25J 9/16 | (2006.01) |
| B25J 15/06 | (2006.01) |

(52) U.S. Cl.
CPC ........... *B25J 9/0093* (2013.01); *B25J 9/1664* (2013.01); *B25J 9/1694* (2013.01); *B25J 9/1697* (2013.01); *B25J 15/0052* (2013.01); *B25J 15/065* (2013.01); *G05B 2219/39102* (2013.01); *G05B 2219/39553* (2013.01)

(58) Field of Classification Search
None
See application file for complete search history.

(56) References Cited

U.S. PATENT DOCUMENTS

| 9,008,841 B2 | 4/2015 | Fuhlbrigge et al. |
| 9,346,166 B2 * | 5/2016 | Gotou .................... B25J 9/1697 |
| 2019/0071267 A1 * | 3/2019 | Otsuru ................... B65G 59/02 |

FOREIGN PATENT DOCUMENTS

| JP | 3314890 B2 | 8/2002 |
| JP | 2010-005769 A | 1/2010 |
| JP | 2017-019100 A | 1/2017 |
| WO | 2011031523 A2 | 3/2011 |

OTHER PUBLICATIONS

Extended European Search Report dated Mar. 21, 2019, mailed in counterpart European Application No. 18191470.6, 13 pages.

* cited by examiner

*Primary Examiner* — Yolanda R Cumbess
(74) *Attorney, Agent, or Firm* — Kim & Stewart LLP

(57) ABSTRACT

An article movement apparatus detects information about articles in an accumulation area, picks up one or more articles based on the detected information with a robot arm, then detects the holding state of the articles held on the robot arm, and measures a separation distance between held articles and a sorting area of a conveyance path. When a plurality of held articles is held by the robot arm, an article is selected from amongst the plurality according to distance from the article and to a surface of the sorting area. The selected article is then released to the sorting area.

20 Claims, 11 Drawing Sheets

ARTICLE MOVEMENT APPARATUS, ARTICLE MOVEMENT METHOD, AND ARTICLE MOVEMENT CONTROL PROGRAM

CROSS-REFERENCE TO RELATED APPLICATION

This application is based upon and claims the benefit of priority from Japanese Patent Application No. 2017-175103, filed Sep. 12, 2017, the entire contents of which are incorporated herein by reference.

FIELD

Embodiments described herein relate generally to an article movement apparatus, an article movement method, and an article movement control program that sort articles in a sorting system.

BACKGROUND

In a system that sorts articles such as luggage, parcels, and merchandise, manipulators (such as robot arms) are used to pick up or otherwise manipulate the articles being sorted. For example, in a distribution center that collects and delivers luggage, incoming, unsorted luggage may be picked up by a robot arm and moved to a sorting area, such as an area cell of cross belt sorter or the like, and then sorted by destination or the like automatically. The robot arm grasps the pieces of luggage one by one based on contour, size, orientation, posture, overlap, boundary, and the like of each piece of luggage as detected by a luggage detection unit such as a camera or a sensor. The robot arm then moves the luggage to a particular sorting area. With this arrangement, luggage having different sorting destinations can be prevented from being in the same sorting area and this helps prevent erroneous sorting.

However, if a luggage detection unit does not correctly detect aspects of the pieces of luggage that have been accumulated for sorting, the robot arm may attempt to grasp more than one piece of luggage at a time. For example, if outer edges of each piece of luggage stacked together prior to sorting cannot be correctly determined, then two or more pieces might be and erroneously detected as being just one piece of luggage. In such a situation, the robot arm may actually simultaneously grasp two or more of pieces of luggage and at least one piece may be sent to an incorrect sorting area. Even when individual pieces of luggage are correctly detected, a situation may occur in which the robot arm simultaneously grasp two or more pieces of luggage due a current packing state of pieces of luggage, the size of adjacent luggage, or the like. If such a situation is not detected or prevent, then at least one piece of luggage might be incorrectly moved to a sorting area and potentially lost or delayed.

DETAILED DESCRIPTION

Example embodiments provide an article movement apparatus, an article movement method, and an article movement control program capable of preventing sorting errors due to the unintended, simultaneous movement of a plurality of articles, such as pieces of luggage, into a sorting area.

In general, according to one embodiment an article movement apparatus includes a first detection unit configured to detect position, size, and relational information of articles within an accumulation area; a robot arm configured to pick up an article based on the position, size, and relational information detected by the first detection unit and move the article from the accumulation area to a sorting area on a conveyance path; a second detection unit configured to detect a holding state of articles on the robot arm and measure a separation distance from each article being held by the robot arm to a surface of the sorting area; and a control unit configured to control the first detection unit, the robot arm, and the second detection unit. The robot arm includes a holding portion group composed of a plurality of holding portions for releasably holding articles. The control unit is configured to control the robot arm such that one selected article from a plurality of articles being held by the robot arm is released in the sorting area before any other article in the plurality of articles. The one selected article is selected according to a measured distance between a lower surface of the selected article and the surface of the conveyance path such that the selected article has the smallest measured distance amongst the plurality of articles being held by the robot arm.

Hereinafter, an article movement apparatus, an article movement method, and an article movement control program (hereinafter, collectively referred to as "an article movement apparatus-and-the-like") according to example embodiments will be described with reference to FIGS. 1 to 21. An article movement apparatus-and-the-like can be used to move articles in various physical distribution systems.

First Embodiment

First, a first embodiment will be described with reference to FIGS. 1 to 16. In the first embodiment, an article movement apparatus that moves articles one by one to a sorting area at a predetermined time difference (interval) in an article sorting system is used as one possible example.

In this context, an article is a tangible object that can be subjected to sorting. In various examples, an article may be luggage, a parcel, merchandise, an item of manufacture, and/or a part to be subsequently assembled into an item of manufacture. In an embodiment, articles may be luggage, a home delivery package, parcels, mail, or the like. Although it is assumed in the present example that the form (size, shape, weight, packing state, and the like) of each article is diverse and not uniform, the form of the articles may be uniform.

Figure 1:
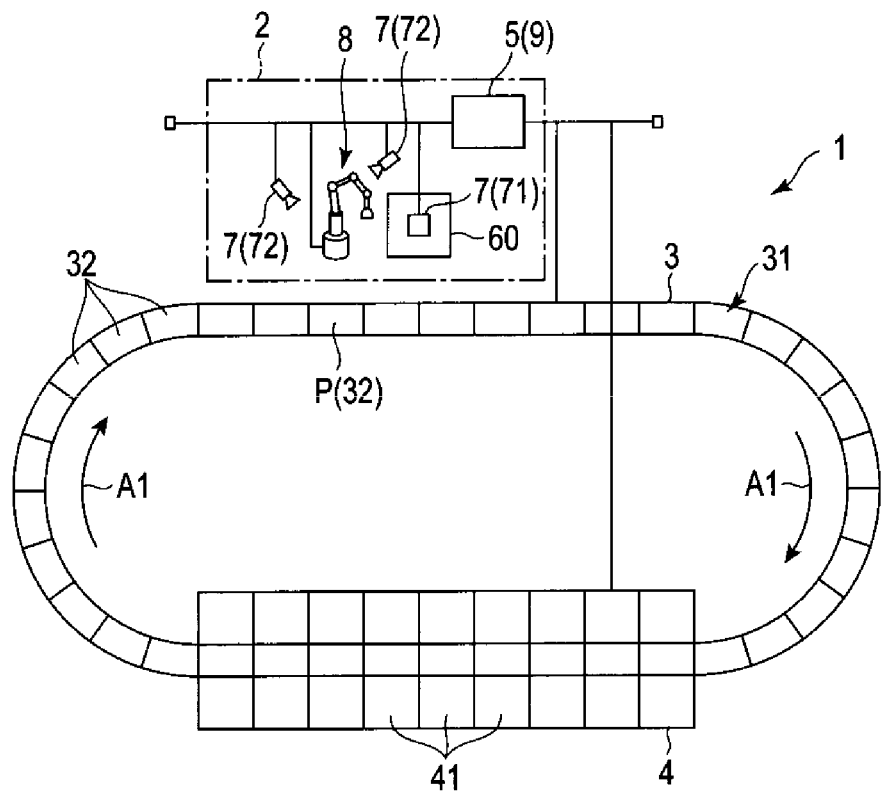
FIG. 1 is a schematic diagram illustrating an article sorting system including an article movement apparatus of an embodiment.

The article sorting system is provided, for example, in a physical distribution center that collects packages for delivery, and then automatically sorts incoming packages to particular sorting destinations (delivery destinations). FIG. 1 schematically illustrates an article sorting system 1 of a first embodiment. As illustrated in FIG. 1, the article sorting system 1 includes an article movement apparatus 2, a conveyance apparatus 3, a sorting apparatus 4, a control apparatus 5, and the like.

The conveyance apparatus 3 provides a flow path that conveys an article 6 (see FIG. 3), and is a conveyor belt operated by a motor or the like in the first embodiment. The conveyance apparatus 3 conveys the articles loaded by the article movement apparatus 2 to the sorting apparatus 4. In the conveyance apparatus 3, a conveyance path 31 is formed in a loop shape. The conveyance path 31 includes a plurality of sorting areas, referred to here as cells 32, on which an article 6 can be placed. Each cell 32 is an individual area corresponding to a division of the conveyance path 31 into a plurality of portions along a conveyance direction, which is the direction indicated by arrow A1 in FIG. 1. With this, the cells 32 are arranged along the conveyance path 31 in the conveyance direction A1 and the cells 32 move at a predetermined speed in the conveyance direction A1.

In the first embodiment, the cell 32 is configured with a cross belt mechanism (not specifically illustrated). The cross belt mechanism of the cell 32 translates the article 6 in a direction crossing (as an example, orthogonal to) the conveyance direction (circulation direction) A1 of the conveyance apparatus 3. The cross belt mechanism comprises, for example, a cross belt, a driving roller, a driven roller, a belt supporting plate, a motor, a pulley, a timing belt, and/or the like. The cross belt can be an endless belt such as a flat belt bridged between a driving roller and a driven roller to rotate. The article 6 is placed on the upper surface of the cross belt. That is, the upper surface on which the article 6 is placed on the cross belt corresponds to the cell 32.

The sorting apparatus 4 sorts the articles 6 conveyed by the conveyance apparatus 3 to each sorting destination. Here, the sorting apparatus 4 includes chutes 41 which branch off from the conveyance path 31 and receive the articles 6 transferred from the respective cells 32 by the cross belt. For example, one chute 41 is provided for each possible sorting destination or grouping. The sorting apparatus 4 includes a reading unit that reads information about sorting destination from an information recording part, such as a barcode or an RFID tag, attached to the article 6. The article 6 is transferred to the chute 41 corresponding to the sorting destination that has been read by the reading unit. A plurality of chutes 41 are provided so as to branch in a direction crossing (for example, orthogonal to) the conveyance direction A1 of the conveyance apparatus 3. The chutes 41 may be disposed at any position on the conveyance path 31 according to the total number of potential sorting destinations of the articles 6.

The control apparatus 5 controls operations of the article movement apparatus 2, the conveyance apparatus 3, and the sorting apparatus 4, respectively. For example, the control apparatus 5 includes a CPU, a memory, an input and output circuit, a timer, and the like. The control apparatus 5 reads various pieces of data by the input and output circuit, performs an operation by the CPU using a program read from the memory, and performs control based on the operation result.

In the first embodiment, the control apparatus 5 is connected to the article movement apparatus 2, the conveyance apparatus 3, and the sorting apparatus 4 in a wired or wireless connection manner, and transmits and receives various pieces of data, calculation results, and the like to and from these devices 2, 3, and 4. For example, the control apparatus 5 circulates and moves the conveyance path 31 (and thus each cell 32) of the conveyance apparatus 3 and conveys the article 6 to the sorting apparatus 4. Then, in the cell 32 on which the article 6 has been placed, the cross belt is operated to transfer the article 6 to the chute 41 corresponding to the sorting destination of the article 6. In this case, the control apparatus 5 appropriately controls acceleration/deceleration and stopping of each motor in the conveyance apparatus 3 and the cross belt mechanism, and causes the reading unit of the sorting apparatus 4 to read the sorting destination of the article 6. The control apparatus 5 controls the article movement apparatus 2 and causes the article movement apparatus 2 to move the various articles one by one to cells 32 at a predetermined interval.

Figure 2:
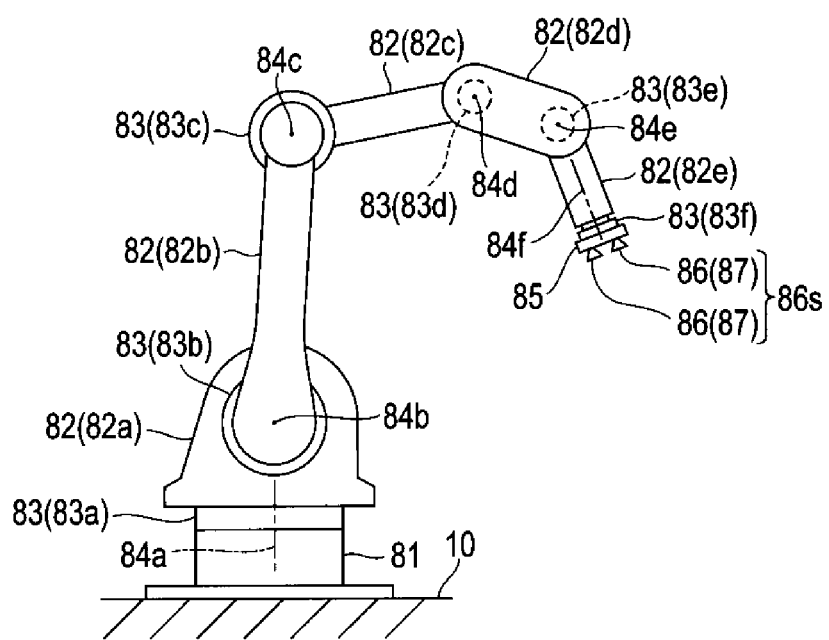
FIG. 2 is a schematic diagram illustrating aspects of a robot arm of an article movement apparatus according to an embodiment.

The article movement apparatus 2 includes a detection unit 7, a robot arm 8, and a control unit 9. FIG. 1 and FIGS. 3 to 6 schematically illustrate a detection unit 7. FIGS. 1 and 2 schematically illustrate a robot arm 8.

Here, the detection unit 7 includes two kinds of detection units (detection unit 71 and detection unit 72) each of which have detection targets that are different. The detection unit 7 is connected to the control unit 9 in a wired or wireless manner. With this, the operation of the detection unit 7 is controlled by a control signal received from the control unit 9, and the detection unit 7 transmits detected information about aspects of the accumulated articles 6 such as shape, size, a holding state, and a separation between the articles 6 to the control unit 9.

Figure 3:
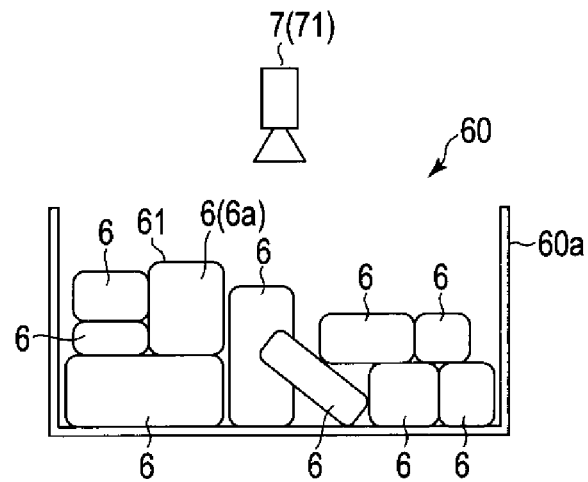
FIG. 3 is a schematic diagram illustrating a first type of a detection unit in an article movement apparatus according to a first embodiment in conjunction with an example of an accumulation form of articles in an accumulation area.

As illustrated in FIG. 3, the first detection unit 71 detects the accumulation form (e.g., stacking state) of the article(s) 6 in an accumulation area 60. The accumulation area 60 is an area in which the articles 6 are gathered before the articles 6 are sorted and corresponds to, for example, a storage area in which incoming articles 6 can be stored, a load bin of a carriage on which the articles 6 can be loaded, or the like. FIG. 3 illustrates as an example a state in which the article 6 is stored in a basket 60a corresponding to the accumulation area 60. In this context, the phrase "accumulation form" refers to the contours, sizes, orientations, postures, overlaps, boundary positions, and the like of the accumulated articles 6 in the storage area 60. In the first embodiment, a 3D camera is applied as the first detection unit 71 in order to detect details of accumulation form(s) of the articles 6. With this, the first detection unit 71 captures stereoscopic images of the articles 6 and is thus capable of more accurately ascertaining details of the accumulation form of the articles 6.

The first detection unit 71 is positioned and fixed apart from the accumulation area 60 vertically upward by a predetermined distance. The predetermined distance is a distance at which the article 6 accumulated in the accumulation area 60 fits within the angle of view by the first detection unit 71 and with which a focus can be adjusted. For example, the first detection unit 71 is disposed on the upper portion of a frame surrounding the robot arm 8.

Figure 4:
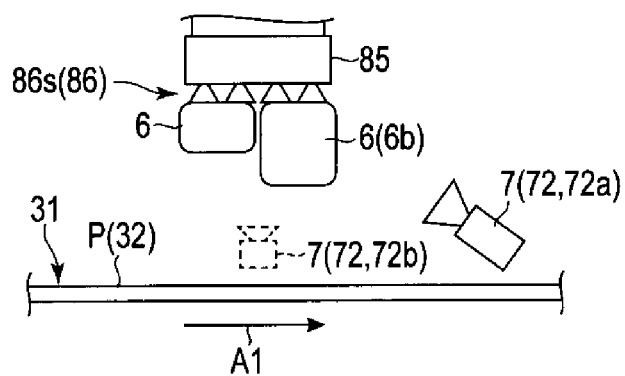
FIG. 4 is a schematic diagram illustrating a second type of a detection unit of an article movement apparatus according to a first embodiment together with an example of a holding status of articles in a robot arm.
Figure 5:
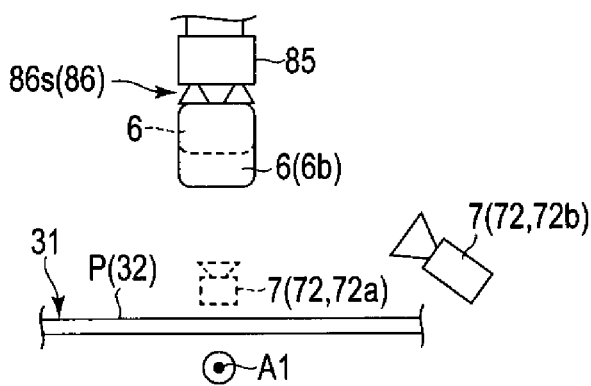
FIG. 5 is a schematic diagram illustrating aspects of a second type detection unit of the article movement apparatus according to a first embodiment from a view direction different from that in FIG. 4 together with an example of the holding status of an article in the robot arm.

As illustrated in FIGS. 4 and 5, the second detection unit 72 detects the holding state of the article(s) 6 picked up by the robot arm 8. In the first embodiment, a standard camera is applied as the second detection unit 72. Since the second detection unit 72 does not need to stereoscopically capture images of the article(s) 6, the second detection unit 72 need not be a 3D camera like the first detection unit 71 but may be a 2D camera. More than one second detection unit 72 may be provided and the number and arrangement of these second detection units 72 can be set arbitrarily. For example, two cameras (cameras 72a and 72b illustrated in FIGS. 4 and 5) may be arranged so as to capture the holding state of the article(s) 6 on the robot arm 8 from two directions crossing on a horizontal plane. In some examples, only one camera may be arranged so that the holding state of the article 6 in the robot arm 8 can be captured obliquely from below. Alternatively, in other examples, one camera that captures the holding state from one direction parallel to the horizontal plane may be used and an end effector 85 of the robot arm 8 may be rotated with respect to an arm portion 82 to provide images of the holding state from different angles within the view of the horizontally placed fixed camera. In short, it suffices to use and arrange any number of second detection units so long as the number and arrangement is capable of accurately capturing the holding state of the article 6 on the robot arm 8 at some predetermined position. The second detection unit 72 is capable of detecting how many articles 6 are being held by the robot arm 8 along with which holding portion(s) 86 are being utilized to hold the article(s) 6.

The second detection unit 72 can measure the separation distance between the articles 6 being held by the robot arm 8 and a road surface (e.g., the upper surface of the cell 32) of the conveyance path 31. For example, in a case where the robot arm 8 holds a plurality of articles 6, the second detection unit 72 measures a distance between each held article 6 and the road surface of the conveyance path 31. The separation distance corresponds to a height from the road surface of the conveyance path 31 to the lowermost portion of the article 6. With this, it is possible to determine, among the plurality of articles 6 held by the robot arm 8, which article 6 is closest to the road surface of the conveyance path 31. Then, it is possible to detect which holding portion 86 holds the article closest to the road surface.

The second detection unit 72 is positioned and fixed laterally or downwardly away by a predetermined distance or both laterally and downwardly away by a predetermined distance, from a movable range of the robot arm 8. The predetermined distance is a distance at which the article(s) 6 held by the robot arm 8 and the conveyance path 31 (more particularly a cell 32) to which the article(s) 6 being moved each fit within the angle of view by the second detection unit 72 and with which a focus can be adjusted. For example, the second detection unit 72 is arranged on a side portion, a lower portion, or the like of the frame that surrounds the robot arm 8. FIGS. 4 and 5 illustrate an example in which two second detection units 72a and 72b are arranged in two different directions orthogonal to each other on the horizontal plane so that the holding state of the article(s) 6 can be viewed obliquely from below.

The robot arm 8 picks up an article 6 accumulated in the accumulation area 60, and moves the article 6 from the accumulation area 60 to the conveyance path 31. Specifically, the robot arm 8 moves each article 6 to an individual sorting area (cell 32) corresponding to a specific position (position P illustrated in FIG. 1) on the conveyance path 31. In the following description, unless otherwise distinguished, the sorting area (cell) 32 refers to a sorting area (cell) 32 at the position P on the conveyance path 31. FIG. 2 illustrates a configuration of the robot arm 8 according to the first embodiment. As illustrated in FIG. 2, the robot arm 8 includes a base portion 81 and an arm portion 82.

The base portion 81 is installed on an installation surface 10. In an embodiment, as an example, the base portion 81 is positioned and fixed to a floor surface of a building provided with the article sorting system 1. The base portion 81 may be movable with respect to the floor surface without being positioned and fixed as such. For example, the base portion 81 may be slidably supported along a guide rail or the like laid on the floor surface. With this, it is possible to move the robot arm with respect to the floor surface.

The arm portion 82 is connected by a plurality of joint portions 83 to be expanded from the proximal end to the distal end, which is a connection part with the base portion 81. The arm portion 82 is subdivided into a plurality of arm portions 82*a* to 82*e* by joint portions 83 (83*a* to 83*e*). The first arm portion 82*a* is connected to the base portion 81 by a first joint portion 83*a* and is rotatable around a first axis 84*a*. A second arm portion 82*b* is connected to the first arm portion 82*a* by a second joint portion 83*b* and is rotatable around a second axis 84*b*. A third arm portion 82*c* is connected to the second arm portion 82*b* by a third joint portion 83*c* and is rotatable around a third axis 84*c*. A fourth arm portion 82*d* is connected to the third arm portion 82*c* by a fourth joint portion 83*d* and is rotatable around a fourth axis 84*d*. A fifth arm portion 82*e* is connected to the fourth arm portion 82*d* by a fifth joint portion 83*e* and is rotatable around a fifth axis 84*e*.

The end effector 85 is attached to the tip end of the arm portion 82 (in other words, the distal end of the fifth arm portion 82*e*). The end effector 85 is connected to the fifth arm portion 82*e* by a sixth joint portion 83*f* and is rotatable around a sixth axis 84*f*.

The five arm portions 82*a* to 82*e* and the end effector 85 are rotated about the respective axes 84*a* to 84*f* by a control motor (not illustrated). With this, the arm portion 82 is set in a desired posture with respect to the base portion 81, and is freely displaceable within a predetermined range. The movable range includes the accumulation area 60 of the article 6 and the sorting area (cell) 32 corresponding to the specific position P of the conveyance path 31. For example, the arm portion 82 and the end effector 85 are rotated around the axes 84*a* to 84*f* so as to make it possible to move the position of the plurality of articles 6 held by a holding portion group 86*s*, which will be described later, with respect to the conveyance direction A1 of the conveyance path 31.

A configuration of the robot arm 8 is not limited to the configuration in which the operation of the robot arm 8 is controlled about the six axes 84*a* to 84*f* as in the first embodiment, and the robot arm 8 may be configured in such a way that the operation of the robot arm 8 is controlled to rotate around five axes or less, or seven or more axes.

As illustrated in FIG. 2, the end effector 85 includes holding portion group 86*s* including holding portions 86 for releasably holding the article 6. That is, the holding portion group 86*s* can hold the article 6 using a holding portion 86 and release the held article 6 from the holding portion 86 as appropriate. With this, the robot arm 8 grasps the articles 6 in the accumulation area 60 and releases the held article 6 on the cell (sorting area) 32 of the conveyance apparatus 3 such that the article 6 can be moved from the accumulation area 60 to the cell 32.

The configuration of the holding portions 86 is not particularly limited as long as article 6 can be releasably held. In the first embodiment, as an example, the holding portion 86 is a suction mechanism that holds and releases the article 6 with vacuum. The suction mechanism includes, for example, a suction disk 87 that attaches on the article 6, a vacuum pump, a sensor that senses that the suction disk 87 is contacting the article 6. An opening 88 through which air can be withdrawn or supplied out air is formed in the suction disk 87 (see FIG. 6). The opening 88 is connected to the pump via a tube. By bringing the suction disk 87 into contact with the article 6 and removing air via the opening 88 using the pump, the inside of the suction disk 87 becomes a negative pressure (vacuum state) which can be used to hold the article 6. On the other hand, when the inside of the suction disk 87 is open to the atmosphere (or air is supplied into the suction disk 87 via the opening 88 by the pump or the like) the suction disk 87 releases the article 6. Air flow through the opening 88 can be controlled by opening and closing an electromagnetic valve provided in a tube or the like connected to the opening 88.

Figure 6:
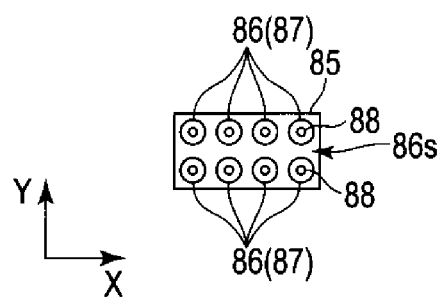
FIG. 6 is a schematic diagram illustrating an example of the number and arrangement pattern of holding portions in a holding portion group of the article movement apparatus according to a first embodiment.

The number and arrangement of the holding portions 86 may be set according to the expected size and weight of the articles 6 to be held by the robot arm 8. For example, a predetermined number of holding portions 86 (suction disks 87) may be arranged to be aligned over a predetermined range. With this, the holding portion group 86*s* may hold a plurality of articles 6 depending on the size and weight of the article 6. That is, the robot arm 8 can hold two or more articles 6 at a time. FIG. 6 depicts an example of the number and arrangement pattern of the holding portions 86 in the first embodiment. In this case, four holding portions 86 (suction disks 87) are linearly arranged at equal intervals along the X-direction and two rows in the X-direction are aligned in the Y-direction. That is, the holding portion group 86*s* of the end effector 85 is configured with eight holding portions 86 (suction disks 87).

The control unit 9 controls the operations of the detection unit 7 and the robot arm 8, respectively. For example, the control unit 9 includes a CPU, a memory, an input and output circuit, a timer, and the like. In the first embodiment, the control unit 9 is unified with the control apparatus 5 of the article sorting system 1 described above. That is, the control apparatus 5 is configured to also function as a control unit 9 of the article movement apparatus 2. However, the control unit 9 may be configured to be independent from the control apparatus 5 and to perform control of the operations of detection unit 7 and the robot arm 8.

The control unit 9 (see FIG. 1) is connected to the detection unit 7 (including first detection unit 71 and second detection unit 72) and the robot arm 8 in a wired or wireless connection manner, and transmits and receives various data, operation results, and the like to and from the detection unit 7 and robot arm 8. With this, the control unit 9 reads data, which is detected by controlling the operation of the detection unit 7, by the input and output circuit, performs an operation by the CPU using the program (article movement control program) read from the memory, and controls the operation of the robot arm 8 based on the operation result.

The operation and action of the article movement apparatus 2 having such a configuration will be described according to a control flow of the control unit 9 with respect to the detection unit 7 and the robot arm 8. FIGS. 7 to 11 illustrate control flows of the control unit 9 with respect to the first detection unit 71, the second detection unit 72 and the robot arm 8 in the article movement apparatus 2 of the first embodiment.

Figure 7:
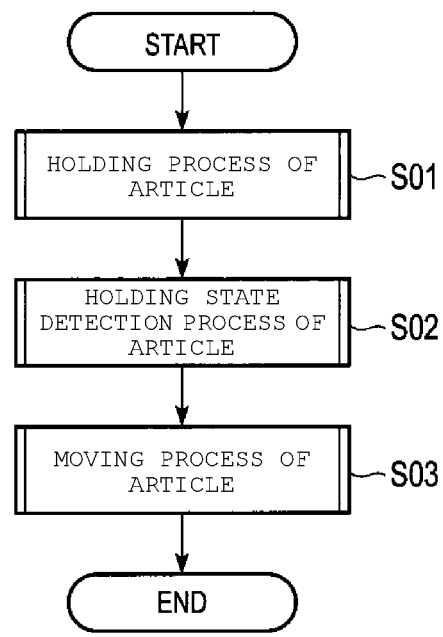
FIG. 7 is a flow chart of control performed by a control unit of the article movement apparatus according to a first embodiment.
Figure 8:
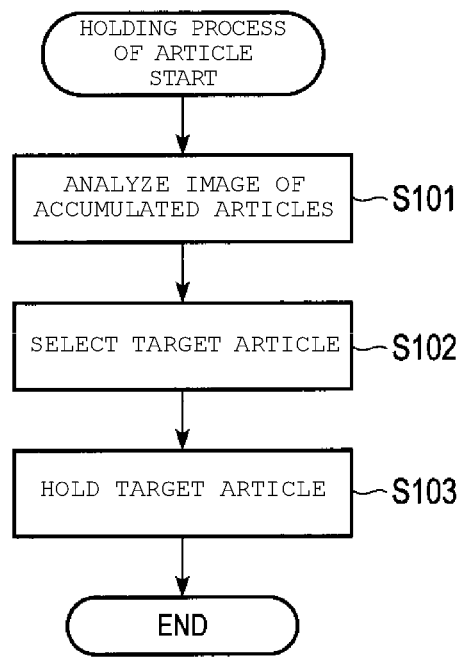
FIG. 8 is a control flow chart of an article holding process performed by a control unit of an article movement apparatus according to a first embodiment.

In moving the article 6 from the accumulation area 60 to the sorting area (cell) 32 of the conveyance path 31, as illustrated in FIG. 7, the control unit 9 performs a holding process (S01), a holding state detection process (S02), and a moving process (S03). These processes are repeated, for example, while articles 6 remain in the accumulation area 60 until there are no accumulated articles 6. First, the holding process of the article 6 will be described. FIG. 8 illustrates a control flow of the control unit 9 in the holding process of the article 6.

As illustrated in FIG. 8, in the holding process of the article 6, the control unit 9 causes the first detection unit 71 to detect the accumulation form (contour, size, direction, posture, overlap, boundary, and the like) of the article 6 in the accumulation area 60. Specifically, the control unit 9 causes the first detection unit 71 to capture images (still images or moving images) of the articles 6 accumulated in the accumulation area 60 and to analyze the captured images (S101). The first detection unit 71 analyzes the captured image and transmits data (hereinafter, referred to as accumulation form data) of the accumulation form of the articles 6 in the accumulation area 60 to the control unit 9 as the analysis result.

Based on the accumulation form data transmitted from the first detection unit 71, the control unit 9 selects an article 6 (hereinafter, referred to as a target article) to be moved to the cell 32 from among the plurality of articles 6 accumulated in the accumulation area 60 (S102). For example, the control unit 9 selects the article 6, which is stacked on the uppermost side (closest to the first detection unit 71), among the plurality of articles 6 accumulated in the accumulation area 60 as the target article. In the accumulation form of the articles 6 as illustrated in FIG. 3, the control unit 9 selects an article 6a as the target article. Then, the control unit 9 specifies an accumulation form of the target article based on the accumulation form data.

After the target article is selected, the control unit causes the robot arm 8 to hold the target article (S103). For that reason, the control unit 9 operates the arm portion 82 of the robot arm 8 to position the holding portion 86 above the accumulation area 60 of the article 6 and direct the holding portion 86 to the target article. Subsequently, the control unit 9 lowers the arm portion 82 toward the target article and controls the air pump and the electromagnetic valve to suck air from the opening 88 of the suction disk 87. Then, the control unit 9 brings the suction disk 87 into contact with the target article and causes the suction disk 87 to suction the target article. The control unit 9 causes the sensor of the suction mechanism to sense the presence or absence of suction between the suction disk 87 and the target article. When the sensor detects that the inside of the suction disk is a negative pressure, the control unit 9 determines that the suction disk 87 is suctioned onto the target article. The portion of the target article held on the holding portion 86 (suctioned by the suction disk 87) is, for example, the highest portion (upper surface (ceiling surface)) of the target article and is set by the control unit 9 based on the accumulation form data. For example, in the case of an accumulation form of the articles 6 as illustrated in FIG. 3, the control unit 9 sets an upper surface 61a of an article 6a as a suction portion.

When the arm portion 82 is caused to perform a desired operation, the control unit 9 performs acceleration and deceleration (output adjustment), stop, and the like of the control motor (not illustrated) of the robot arm 8 to displace (rotate) the arm portion 82 with respect to the base portion 81. Similarly, when the robot arm 8 is operated in the holding state detection process and moving process of the article 6 to be described later, the control unit 9 controls the control motor.

Figure 9:
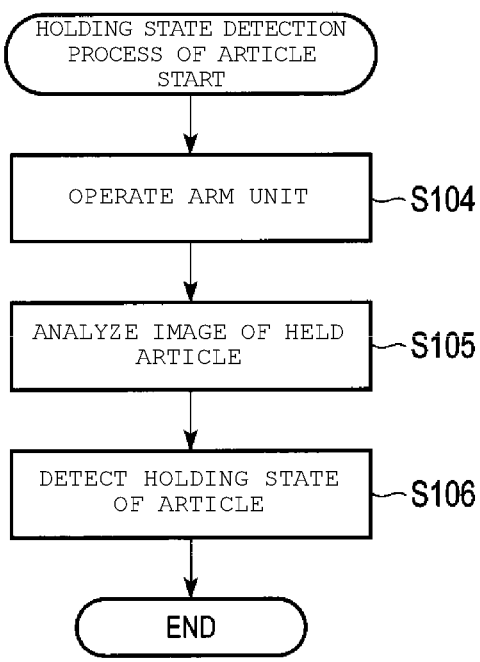
FIG. 9 is a control flowchart of an article holding state detection process performed by the control unit of an article movement apparatus according to a first embodiment.

With this, the target article is held by the holding portion 86 (suctioned by the suction disk 87). The held target article is moved from the accumulation area 60 to the cell 32 of the conveyance path 31. When the target article is moved, the control unit 9 performs the holding state detection process of the article 6. The holding state detection process of the article 6 is a process of detecting the holding state (actual holding state of the article 6) of the article 6 which is currently held by the robot arm 8. Hereinafter, the holding status detection process of the article 6 will be described. FIG. 9 illustrates a control flow of the control unit 9 in the holding state detecting process.

As illustrated in FIG. 9, in the holding state detection process, the control unit 9 allows the holding state of the article 6 held by the holding portion 86 of the robot arm 8 to be detected. For that reason, the control unit 9 causes the arm portion 82 to operate so that the article 6 held by the holding portion 86 (suctioned by the suction disk 87) falls within the angle of view of the second detection unit 72 or to be present at a predetermined position within the angle of view of the second detection unit 72 (S104). For example, the control unit 9 moves the arm portion 82 above the accumulation area 60 of the article 6 so as to raise the article 6 held on the holding portion 86 (suctioned by the suction disk 87). In a state in which the article 6 held by the holding portion 86 (suctioned by the suction disk 87) falls within the angle of view of the second detection unit 72, the control unit 9 causes the image (still image or moving image) of the article 6 to be captured and causes the captured image to be analyzed (S105). In this case, the control unit 9 may rotate the end effector 85 around the sixth axis 84f to cause the second detection unit 72 to capture images of a plurality of angles. The second detection unit 72 analyzes the captured image and transmits data (hereinafter, referred to as holding status data) of the holding state of the article by the robot arm 8 to the control unit 9 as an analysis result.

Based on holding status data transmitted from the second detection unit 72, the control unit 9 detects the holding state of the article 6 actually held by the robot arm 8 (S106). Specifically, the control unit 9 specifies how many articles 6 are held by the robot arm 8 and specifies which suction disk 87 (holding portion 86) is suctioning the article 6. With this, the control unit 9 can detect whether or not the article 6 is held other than the target article, in short, whether or not a plurality of articles 6 are held. In addition, the control unit 9 can detect by which holding portion(s) 86 the article 6 is being held.

As such, whether or not a plurality of articles 6 is being held must be detected because the robot arm 8 (more specifically, the holding portion group 86s) can accidentally (unintentionally) hold a plurality of articles 6. That is, the situation in which the robot arm 8 holds a plurality of articles 6 may be caused either accidentally or intentionally. In a first embodiment, it is assumed that the robot arm 8 is intended to hold the articles 6 one by one. For that reason, in the first embodiment, it is assumed that a situation of holding a plurality (two as one example) of the articles 6 only accidentally occurs, and an only this actual holding state of the articles 6 by the robot arm 8 must be detected.

Figure 10:
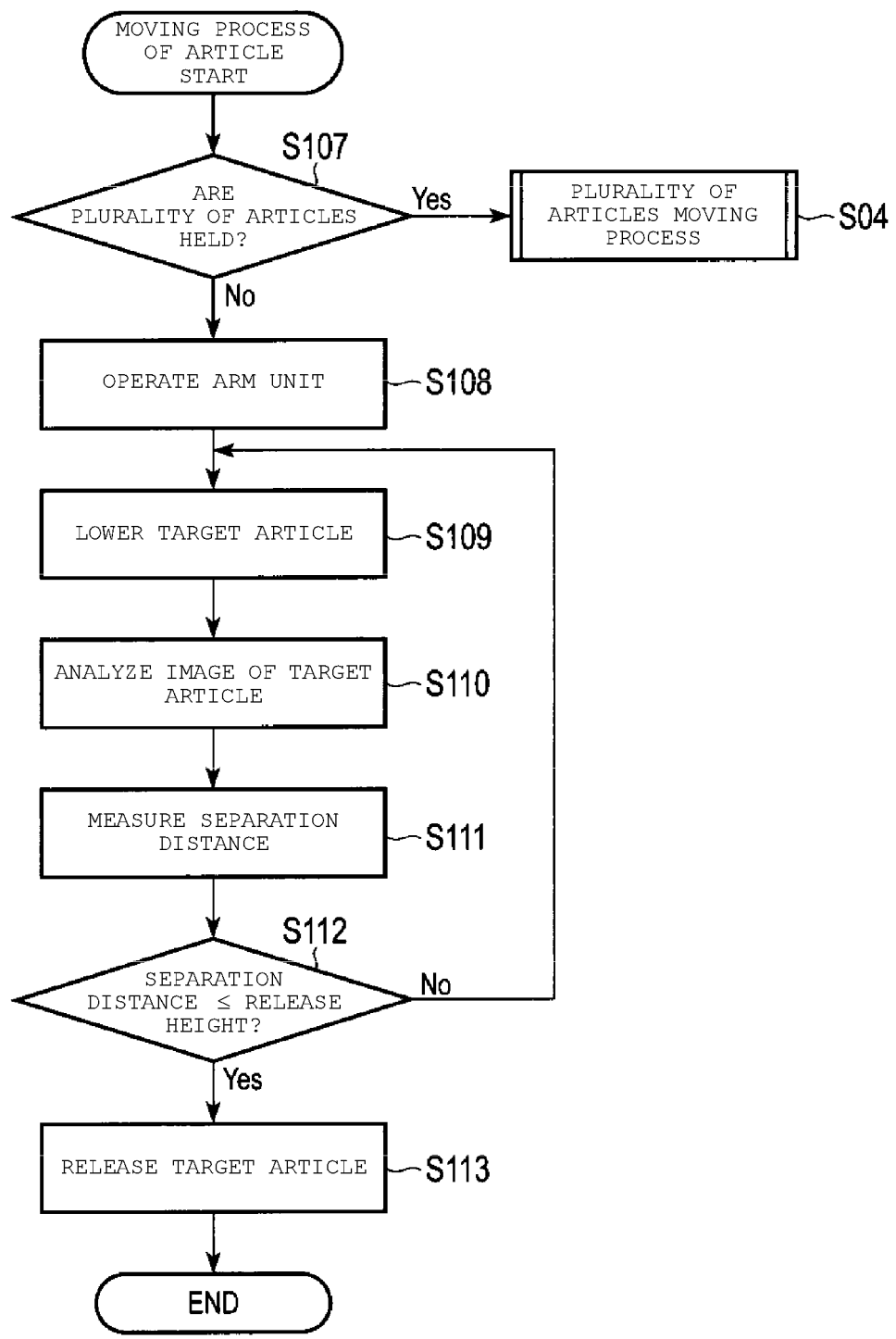
FIG. 10 is a control flow chart of an article moving process performed by the control unit of an article movement apparatus according to a first embodiment.
Figure 11:
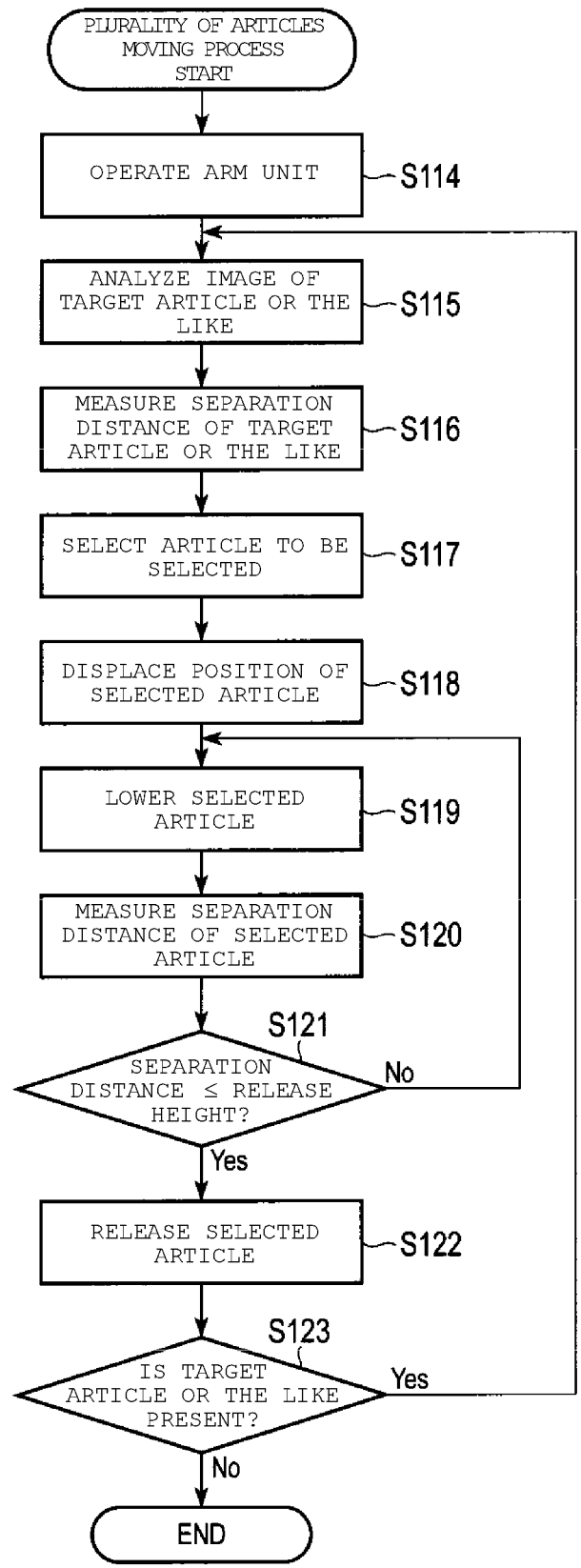
FIG. 11 is a control flow chart of a plurality-of-articles moving process performed by the control unit of an article movement apparatus according to a first embodiment.

As such, after the holding state of the article 6 is detected, the control unit 9 performs the moving process of the article 6. In the moving process of the article 6, the control unit 9 changes a control content depending on whether or not the held article 6 is other than the target article. Hereinafter, the movement process of the article 6 will be described. FIGS. 10 and 11 illustrate the control flow of the control unit 9 in the moving process of the article 6.

As illustrated in FIG. 10, in the moving process of the article 6, the control unit 9 determines whether or not the robot arm 8 (holding portion group 86s) holds a plurality of articles 6 (S107).

In a case where the robot arm 8 does not hold the plurality of articles 6, that is, in a case where the article 6 held by the holding portion group 86s (suctioned by the suction disk 87) is only the target article, the control unit 9 causes the robot arm 8 to operate as follows so as to move the target article to the sorting area (cell) 32 of the conveyance path 31.

In this case, the control unit 9 operates the arm portion 82 of the robot arm 8 to position the holding portion 86 at a reference position above the conveyance path 31 (the cell 32), and causes the holding portion 86 to be directed to the road surface of the conveyance path 31 (upper surface of the cell 32) (S108). With this, the article 6 (target article) held on the holding portion 86 (suctioned by the suction disk 87) is positioned vertically above the road surface (upper surface 32 of the cell) of the conveyance path 31. The reference position is set in advance as a height position of the holding portion 86 which becomes a reference when the second detection unit 72 captures an image illustrating a positional relationship between the target article held by the robot arm 8 and the upper surface of the cell 32.

Then, the control unit 9 causes the arm portion 82 to operate (S109) so as to lower the target article held by the holding portion 86 (suctioned by the suction disk 87) toward the upper surface of the cell 32. In this case, the control unit 9 causes the second detection unit 72 to measure the separation distance between the target article held by the robot arm 8 and the road surface (upper surface of the cell 32) of the conveyance path 31. Specifically, the control unit 9 causes the second detection unit 72 to capture an image (still image or moving image) illustrating the positional relationship between the target article held by the robot arm 8 and the upper surface of the cell 32 and causes the second detection unit 72 to analyze the captured image (S110). The second detection unit 72 analyzes the captured image and transmits data (hereinafter, referred to as separation state data) of a separation state between the target article and the upper surface of the cell 32 to the control unit 9 as an analysis result. The second detection unit 72 sequentially acquires separation state data until the target article is moved to the cell 32, and transmits the acquired separation state data to the control unit 9.

Based on the separation state data transmitted from the second detection unit 72, the control unit 9 measures the separation distance between the target article and the upper surface of the cell 32 (S111). That is, the control unit 9 specifies the height from the upper surface of the cell 32 to the lowermost portion of the target article.

Then, the control unit 9 determines whether or not the separation distance between the target article and the upper surface of the cell 32 is equal to or less than a predetermined distance (S112). The predetermined distance (hereinafter, referred to as a release height) is set in advance to a value (height) not causing damage or the like to the article 6 even if the article 6 (including the target article) is released from the holding portion 86 and dropped into the cell 32. The release height is stored in a memory or the like. For example, at the time of such determination, the control unit 9 reads a value of the release height as an argument (parameter) from the memory and compares the value with the measured separation distance.

In a case where it is determined that the separation distance is equal to or less than the release height, the control unit 9 causes the robot arm 8 to release the target article (S113). In this case, the control unit 9 controls the air pump and the electromagnetic valve to open the inside of the suction disk 87 attached to the target article to the atmosphere. In this case, the control unit 9 simultaneously opens the inside of all the suction disks 87 attached to the target article to the atmosphere. With this, it is possible to improve movement throughput of a target article to the cell.

In a case where it is determined in S112 that the separation distance exceeds the release height, the control unit 9 repeats control from S109 to S111 until it is determined that the separation distance is equal to or less than the release height.

On the other hand, in a case where it is determined in S107 that the robot arm 8 holds a plurality of articles 6, that is, that the articles 6 held (attached to the suction disk 87) by the holding portion group 86s are not only the target article, the control unit 9 performs a plurality-of-articles moving process (S04). In the plurality-of-articles moving process, the control unit 9 moves the articles 6 (hereinafter, referred to as target article-and-the-like) including the target article one by one to the sorting area (cell) 32 of the conveyance path 31, and causes the robot arm 8 to operate as follows. FIG. 11 illustrates a control flow of the control unit 9 in the plurality-of-articles moving process.

In this case, the control unit 9 operates the arm portion 82 of the robot arm 8 to position the holding portion 86 at the reference position above the cell 32 and directs the holding portion 86 toward the upper surface of the cell 32 (S114). With this, the target article-and-the-like held by the holding portion 86 is positioned vertically above the upper surface of the cell 32.

Next, the control unit 9 uses the second detection unit 72 to measure the separation distance between the target article-and-the-like held by the robot arm 8 and the road surface (upper surface of the cell 32) of the conveyance path 31. Specifically, the control unit 9 causes the second detection unit 72 to capture an image (still image or moving image) illustrating the positional relationship between the target article-and-the-like held by the robot arm 8 and the upper surface of the cell 32, and causes the second detection unit 72 to analyze the captured image (S115). The second detection unit 72 analyzes the captured image, and transmits data (hereinafter, referred to separation state data of target article-and-the-like) of the separation state between the target article-and-the-like and the upper surface of the cell 32 to the control unit 9 as an analysis result. The second detection unit 72 sequentially acquires and transmits the separation state data of target article-and-the-like to the control unit 9 until all target article-and-the-like are moved to the cell 32.

Based on the separation state data of target article-and-the-like transmitted from the second detection unit 72, the control unit 9 measures each of the separation distances between the target article-and-the-like and the upper surface of the cell 32 (S116). That is, the control unit 9 specifies the height from the upper surface of the cell 32 to the lowermost portion of the target article-and-the-like for each of the target article-and-the-like. Then, the control unit 9 selects one particular article 6 (hereinafter, referred to as a selected article) having the shortest separation distance from the upper surface of the cell 32, among the target article-and-the-like held by the robot arm 8 at the present time (S117). In other words, an article having lowest height from the target article-and-the-like held by the robot arm 8 to the road surface (upper surface of the cell 32) of the conveyance path 31, that is, a bulky article 6 having the highest height is selected. For example, in the case illustrated in FIGS. 4 and 5, the control unit 9 selects an article 6b as a selected article. In a case where there are multiple of the articles 6 equally having the lowest height to the road surface of the conveyance path 31, a plurality of selected articles can be selected. This is the case where contours of the target article-and-the-like held by the robot arm 8 are substantially the same.

After the selected article is selected, the control unit 9 operates the arm portion 82 to change the position of the selected article (S118). Specifically, the control unit 9 rotates the end effector 85 about the sixth axis 84f so that the selected article is positioned downstream of the other target article-and-the-like in the conveyance direction A1 of the conveyance path 31. With this, for example, the selected article is positioned on the most downstream side in a state in which the target article-and-the-like is aligned along the conveyance direction A1 (state in which the X-direction illustrated in FIG. 6 is along the conveyance direction A1).

In a case in which a plurality of the selected articles is selected, the end effector 85 may be rotated so that any one of the selected articles is positioned further downstream in the conveyance direction A1.

Subsequently, the control unit 9 causes the arm portion 82 to operate so that the selected article is lowered toward the upper surface of the cell 32 (S119). In this case, the control unit 9 measures the separation distance between the selected article and the upper surface of the cell 32, based on the separation state data of target article-and-the-like transmitted from the second detection unit 72 (S120). That is, the control unit 9 specifies the height from the upper surface of the cell 32 to the lowermost portion of the selected article.

Then, the control unit 9 determines whether or not the separation distance between the selected article and the upper surface of the cell 32 is equal to or less than the release height (S121).

In a case where it is determined that the separation distance is equal to or less than the release height, the control unit 9 causes the robot arm 8 to release the selected article (S122). In this case, the control unit 9 performs the same control as that in S113 on the selected article. In contrast, in a case where it is determined that the separation distance exceeds the release height, the control unit 9 repeats control of S119 and S120 for the selected article until it is determined that the separation distance is equal to or less than the release height.

The control unit 9 performs control of S115 and subsequent steps again until all target article-and-the-like are moved to the sorting area (cell) 32 of the conveyance path 31 (S123). With this, it is possible to move all the target article-and-the-like one by one from the accumulation area 60 to the sorting area (cell) 32 of the conveyance path 31 with a predetermined time difference.

Figure 12:
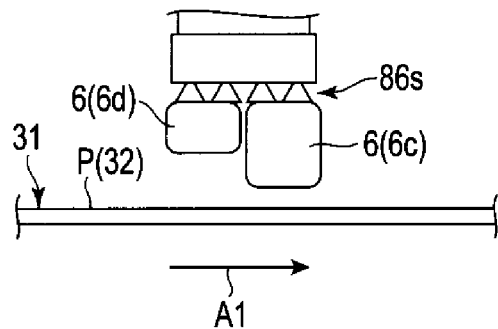
FIG. 12 is a first view illustrating an example of release of an article in an article movement apparatus according to an embodiment in time series.
Figure 13:
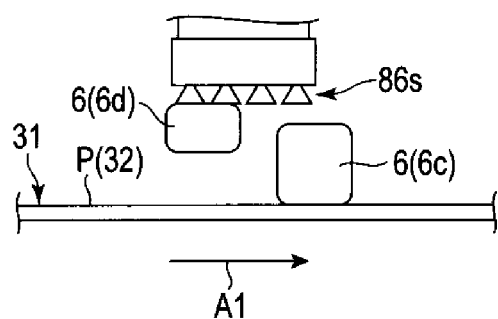
FIG. 13 is a second view illustrating release of an article in an article movement apparatus according to a first embodiment in time series.
Figure 14:
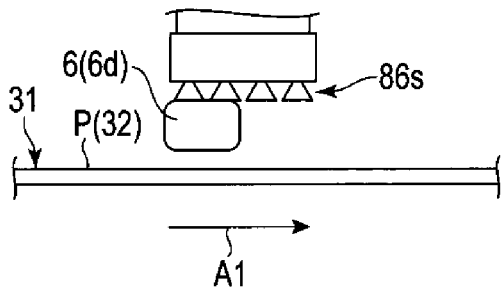
FIG. 14 is a third view illustrating release of an article in an article movement apparatus according to a first embodiment in time series.
Figure 15:
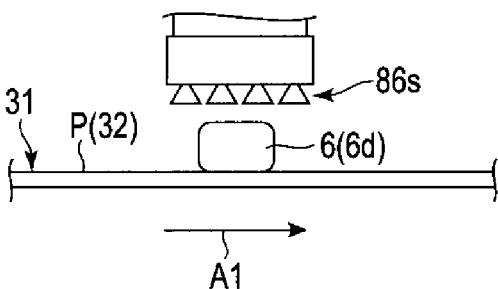
FIG. 15 is a fourth view illustrating release of an article in the article movement apparatus according to a first embodiment in time series.

For example, as illustrated in FIG. 12, in a case where two articles 6 are held by the holding portion group 86s, an article 6c positioned at the most downstream side in the conveyance direction A1 is first released as illustrated in FIG. 13, and is moved to the conveyance path 31 (cell 32). With this, as illustrated in FIG. 14, only an article 6d is held in the holding portion group 86s. Thereafter, as illustrated in FIG. 15, the remaining article 6d is released with a predetermined time difference and is moved to the conveyance path 31 (cell 32). The predetermined time difference is set to be equal to or longer than the elapsed time until a cell 32 downstream of the cell 32 to which the selected article is moved is positioned to a specific position (position P illustrated in FIG. 1) or until the cell 32 is positioned downstream of the specific position P, in accordance with a circulation speed of the cell 32 of the conveyance path 31 which is circulating and moving. The predetermined time difference may be caused by a series of operations of the arm portion 82 in the plurality-of-articles moving process or may be caused by allowing the control unit 9 to appropriately hold up the operation of the arm portion 82 with a timer.

As such, according to the article movement apparatus-and-the-like of the first embodiment, the accumulation form of the article 6 in the accumulation area 60 is detected, and the article 6 is held based on the detected accumulation form of the article 6. Next, the holding state of the held article 6 is detected, and the separation distance between the held article 6 and the sorting area (cell) 32 of the conveyance path 31 where the article 6 is conveyed is measured. Then, in a case where it is detected that a plurality of articles 6 are held, the positions of the plurality of held articles 6 in the conveyance direction A1 of the conveyance path 31 are displaced based on the measured separation distance, are sequentially released one by one with a predetermined time difference, and are moved to the sorting area (cell) 32. In another way of achieving the matters described above, a series of procedures are executed by the control unit 9 by an article movement control program.

That is, according to the article movement apparatus-and-the-like of an embodiment, it is possible to detect whether or not a plurality of articles 6 are held by the robot arm 8 and to perform control according to the result. That is, in a case where the plurality of articles 6 are held, these articles 6 can be released one by one with a predetermined time difference. With this, it is possible to move the articles 6 one by one to the sorting area (cell) 32. As a result, it is possible to prevent simultaneous movement (coexistence) of the plurality of articles 6 to one sorting area (cell) 32, for example. Accordingly, the article 6 cannot be erroneously sorted by mistake, and the article 6 can be correctly sorted. That is, sorting accuracy of the article 6 can be improved. Also, since the plurality of articles 6 held are aligned along the conveyance direction A1 of the conveyance path 31 according to the separation distance, it is possible to smoothly move the article 6 to the sorting area (cell) 32 without causing the article 6 to interfere with other articles 6.

In the first embodiment, a case where a situation where the plurality of articles 6 are held by the robot arm 8 occurs accidentally (due to error) has been described, but the plurality of articles 6 may be deliberately (actively) held by the robot arm 8. Even in a case where the plurality of articles 6 is intentionally held, it is possible to prevent simultaneous movement/placement of multiple articles 6 into one sorting area 32. In this case, in addition to the effect of preventing erroneous sorting of the article 6, it is possible to increase movement efficiency of the article 6 to the sorting area 32. Accordingly, it is possible to improve the throughput at the time of sorting the articles 6.

Further, in a case where the situation where a plurality of articles 6 are held by the robot arm 8 occurs accidentally (by error), in the first embodiment, these articles 6 are released one by one with a predetermined time difference while holding the plurality of articles 6. In this case, it is possible to leave only one article 6 (for example, target article) in a state of being held and return the other articles 6 to the accumulation area. Such an embodiment will be described below as a first modification example of the first embodiment.

First Modification Example

Figure 16:
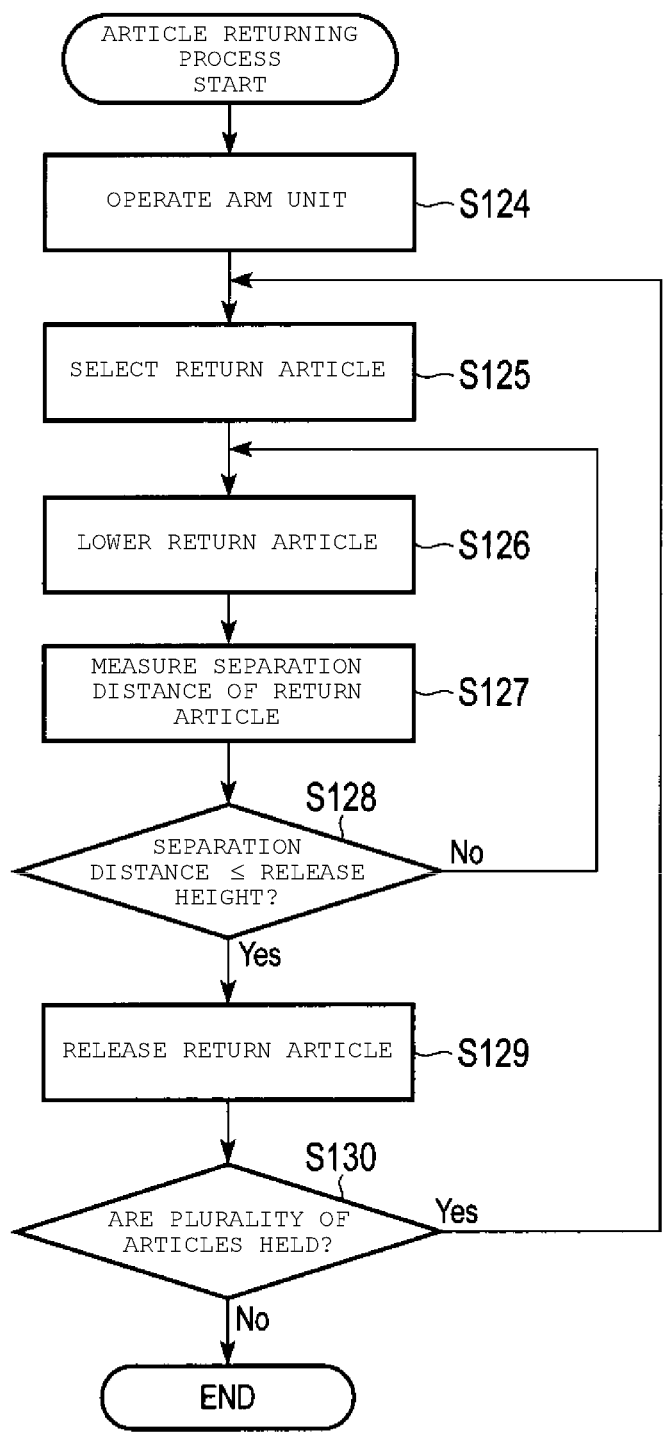
FIG. 16 is a control flow chart of an article returning process performed by a control unit of an article movement apparatus in a first modification example.

In the first modification example, the article moving process (FIG. 10) in the first embodiment described above is changed as follows. Specifically, in a case where it is determined that the robot arm 8 holds a plurality of articles 6 in the article moving process (S107), the control unit 9 performs an article returning process. FIG. 16 illustrates a control flow of the control unit 9 in the article returning process according to the first modification example.

The article returning process in the first modification example will be described with reference to FIG. 16. In the first modification example, in a case where the robot arm 8 holds a plurality of articles 6, the control unit 9 operates the arm portion 82 of the robot arm 8 to position the holding portion 86 above the accumulation area 60 and to be directed to a return area of the article 6 (S124). The return area of the article 6 is a predetermined area in the accumulation area 60 where the article 6 returned to the accumulation area 60 is accumulated again. For example, on the accumulated articles 6 and an article accommodation surface (a storage surface of a basket 60a) of the accumulation area 60 or the like corresponds to the return area.

Next, the control unit 9 selects an article 6 (hereinafter, referred to as a return article) to be returned to the return area from the target article-and-the-like held by the robot arm 8 at the present time (S125). The return article may be any selected. For example, the control unit 9 selects the article 6 other than the target article as the return article. Alternatively, similarly as in the first embodiment, the control unit 9 may cause the second detection unit 72 to measure the separation distance between the target article-and-the-like held by the robot arm 8 and the return area and select the article 6 of which the measured separation distance is the shortest as the return article. In this case, the control unit 9 causes the image (still image or moving image) illustrating the positional relationship between the target article-and-the-like held by the robot arm 8 and the return area to be captured up and causes the captured image to be analyzed. The second detection unit 72 analyzes the captured image and transmits data (hereinafter, referred to as return article separation state data) of a separated state between the target article-and-the-like and the return area, as an analysis result, to the control unit 9. Based on the return article separation state data transmitted from the second detection unit 72, the control unit 9 measures the separation distance between the target article-and-the-like and the return area. That is, the control unit 9 specifies the height from the return area to the lowermost portion of the target article-and-the-like for each of the target article-and-the-like.

After the return article is selected, the control unit 9 performs control from S126 to S129 illustrated in FIG. 16. The control corresponds to control in which the same control as S119 to S122 (FIG. 11) of the plurality-of-articles moving process in the first embodiment is performed on the selected article as the return article and the return article is returned to the return area. While the robot arm 8 holds the plurality of articles 6, that is, until there is only one article 6 held by the robot arm 8, the control unit 9 performs the control from S125 and subsequent steps again (S130).

Then, in a case where there is only one article 6 held by the robot arm 8, the control unit 9 performs control of S108 to S113 (FIG. 10) of the article moving process in the first embodiment. With this, it is possible to move the articles 6 one by one from the accumulation area 60 to the sorting area (cell) 32 of the conveyance path 31 with a predetermined time difference.

As such, according to the first modification example, it becomes easier to cope with a case where it is not necessary to move all articles 6 accumulated in the accumulation area 60 to the sorting area (cell) 32 of the conveyance path 31. For example, in a case where an article 6 other than the target article listed in a sorting list is held by the robot arm 8, the article 6 can be returned to the accumulation area 60 as a return article. Accordingly, it is possible to move only the articles 6 (target article) listed in the sorting list based on information on the sorting destination recorded on a barcode, an IC tag or the like attached to the article 6, and the like.

In the first modification example, control of returning the return article to the return area is repeated until the article 6 held by the robot arm 8 becomes one (S130), but the control may be performed at any timing. For example, after returning one or more return articles, the selected article may be moved to the sorting area (cell) 32 while a plurality (two in an example) of the articles 6 are held, and the remaining articles 6 may be returned to the return area as return articles. With this, it becomes possible to more flexibly cope with a case where it is not necessary to move all of articles 6 accumulated in the accumulation area 60 to the sorting area (cell) 32.

Here, in the embodiment described above, in a case where the robot arm 8 holds two articles 6 (target article-and-the-like), it is possible to position the selected article to the most downstream side in the conveyance direction A1. In contrast, in a case where the robot arm 8 holds three or more articles 6 (target article-and-the-like), the selected article might not be positionable on the most downstream side in the conveyance direction A1.

Figure 17:
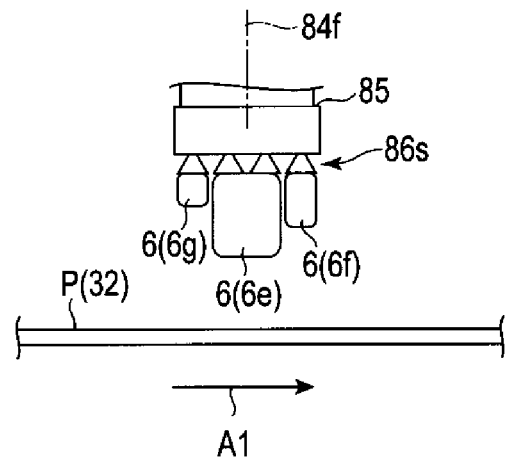
FIG. 17 is a schematic diagram illustrating an example of a holding state of articles in a robot arm of an article movement apparatus in a second modification example.

For example, as illustrated in FIG. 17, this corresponds to a case where the selected article is sandwiched between other articles 6 in a state where three target article-and-the-like are aligned in the conveyance direction A1. When the selected article is released in this state, since the selected article placed on the sorting area (cell) 32 is conveyed in the conveyance direction A1, there is a concern that there will be interference with another article 6 being held (hereinafter, referred to as an obstacle article) downstream of the selected article. In FIG. 17, an article 6e corresponds to the selected article, and an article 6f corresponds to the obstacle article.

In such a case, three target article-and-the-like may be positioned so that there is no other article 6 downstream of the selected article in the conveyance direction A1. This embodiment will be described below as a second modification example of the first embodiment. A state where there exists no other articles 6 downstream of the selected article may include the following three states. A first state corresponds to a state where there is no other article 6 downstream of the selected article, that is, the selected article is positioned on the most downstream side in the conveyance direction A1. A second state corresponds to a state where the selected article and the other articles 6 are positioned to be aligned in a direction (for example, orthogonal direction) crossing the conveyance direction A1. A third state is a state where the selected article conveyed in the conveyance direction A1 does not interfere with other articles 6 even in a case where the selected article is not positioned in the first state and the second state.

Second Modification Example

Figure 18:
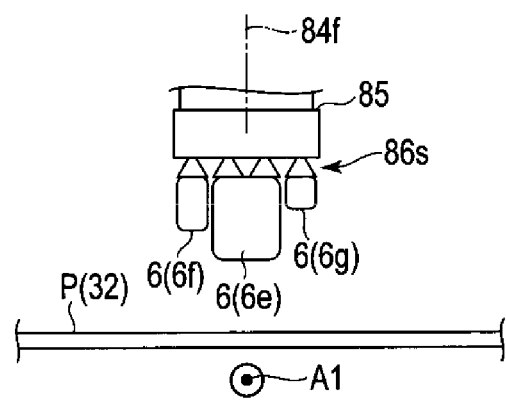
FIG. 18 is a schematic diagram illustrating an example of a holding state of articles displaced from the holding state illustrated in FIG. 17 in a second modification example.

In the second modification example, the plurality-of-articles moving process (FIG. 11) in the first embodiment described above is changed as follows. Specifically, in the plurality-of-articles moving process, after selecting a selected article (S117), the control unit 9 operates the arm portion 82 to change the position of the selected article (S118). In the holding state of the article 6 (6e, 6f, and 6g) as illustrated in FIG. 17, it suffices to displace so that three target article-and-the-like are aligned in a direction orthogonal to the conveyance direction A1. For example, the control unit 9 rotates the end effector 85 around the sixth axis 84f so that the three target article-and-the-like are in a state of being aligned as illustrated in FIG. 18 (a state where the Y-direction illustrated in FIG. 6 is along the conveyance direction A1). With this, it becomes a state in which there is no other article downstream of the selected article in the conveyance direction A1 (direction from the back to the front in FIG. 18). In the conveyance direction A1 illustrated in FIG. 18, the end effector 85 may be rotated so that the positions of the article 6f and the article 6g are opposite to each other with the selected article (article 6e) interposed therebetween.

After the selected article is displaced, the control unit performs control of S119 to S123 (FIG. 11) of the plurality-of-articles moving process in the first embodiment. Accordingly, according to the second modification example, the selected article can be moved to (placed on) the sorting area (cell) 32 without interference by the obstacle article.

Second Embodiment

Next, a second embodiment will be described with reference to FIGS. 19 to 23. As described above, even in the case of holding the article 6 as illustrated in FIG. 17, according to the second modification example, it is possible to avoid interference between the selected article and the obstacle article. However, depending on a form (size, shape, and the like) of the article 6, when the robot arm 8 holds a plurality of articles 6 (target article-and-the-like), the target article-and-the-like is aligned along the direction orthogonal to the conveyance direction A1, there is a possibility that the target article-and-the-like protrudes from the conveyance path 31 (sorting area (cell) 32). There is a possibility that the other articles 6 (obstacle article) cannot be prevented from being present downstream of the selected article in the conveyance direction A1 by merely rotating the end effector 85 about the sixth axis 84f. For example, this corresponds to a case where the periphery of the selected article is surrounded by other articles 6.

In a case where there is such a possibility, it is possible to avoid interference between the selected article and the obstacle article by performing the following control. For example, in the case of the holding state of the article 6 as illustrated in FIG. 17, the selected article may be released from the height at which the selected article can avoid interference with the obstacle article. The height at which interference can be avoided is a height at which the separation distance between the obstacle article and the upper surface of the cell 32 is higher than the height of the selected article. The height of the selected article corresponds to the distance from the lowermost portion to the uppermost portion of the selected article in the particular orientation at which the selected article is being held by the holding portion 86.

On the other hand, it is desirable to release the selected article at a position as low as possible. In consideration of this point, the second embodiment is an embodiment in which the selected article can be released at a lower position without causing the selected article to interfere with the obstacle article, in the case where three or more articles 6 (target article-and-the-like) can be held by the robot arm 8. In the second embodiment, the configuration may be the same as that of the article movement apparatus-and-the-like according to the first embodiment except for the differences described below. Accordingly, only the features of the second embodiment (differences from the first embodiment) will be described below. In this case, the same reference numerals are used for the same configurations as those in the first embodiment in the description, and the same reference numerals are given to those in the drawings.

Figure 19:
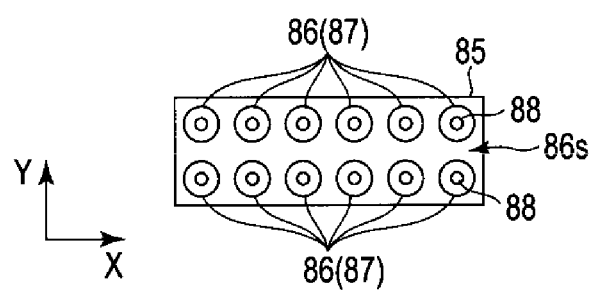
FIG. 19 is a schematic diagram illustrating the number and arrangement pattern of holding portions in a holding portion group of an article movement apparatus of a second embodiment.
Figure 20:
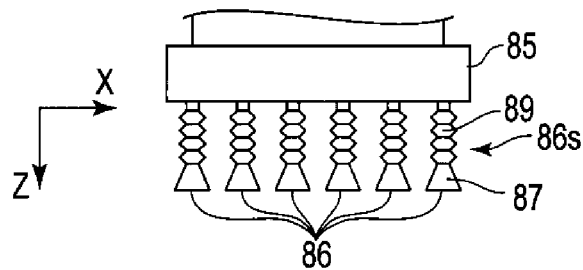
FIG. 20 is a schematic diagram illustrating the number and arrangement pattern of holding portions in a holding portion group of the article movement apparatus according to a second embodiment from a view direction different from that in FIG. 19.

FIGS. 19 and 20 illustrate the configuration of the holding portion group 86s in the end effector 85 of the second embodiment, respectively. As illustrated in FIG. 19, in the second embodiment, six holding portions 86 (suction disks 87) are linearly aligned at equal intervals along the X-direction, and two rows in the X-direction are aligned in the Y-direction. That is, the holding portion group 86s of the end effector 85 is configured with twelve holding portions 86 (suction disks 87). The X-direction and the Y-direction are two directions orthogonal to each other on the same plane.

In the second embodiment, as illustrated in FIG. 20, the suction mechanism of the holding portion 86 is provided with an expansion and contraction portion 89 in addition to the suction disk 87, the air pump, and the sensor (neither is illustrated). The expansion and contraction portion 89 is configured to be expandable and contractible in a direction (Z-direction illustrated in FIG. 20) orthogonal to both the X-direction and the Y-direction. FIG. 20 illustrates an expansion and contraction portion 89 formed in a bellows shape by an elastic member as an example. However, the expansion and contraction portion 89 may not be formed in such a bellows shape but may be configured to be expandable and contractible in a cylinder shape, for example. In FIG. 20, the Z-direction corresponds to the lower side in the vertical direction.

Regardless of the configuration of the expansion and contraction portion 89, an operation system of the expansion and contraction portion 89 is independent of an operation system (tube, electromagnetic valve, air pump, and the like) of the suction disk 87. That is, expansion and contraction of the expansion and contraction portion 89 is performed completely separated from internal pressure control (that is, a suction form of the suction disk 87 to the article 6) of the suction disk 87. Accordingly, internal pressure of the suction disk 87 does not change due to expansion and contraction of the expansion and contraction portion 89, and suction and release of the article 6 by the suction disk 87 and expansion and contraction of the expansion and contraction portion 89 can be individually controlled. For example, pneumatic pressure, hydraulic pressure, electric or mechanical type can be applied to the operation system of the expansion and contraction portion 89.

Figure 22:
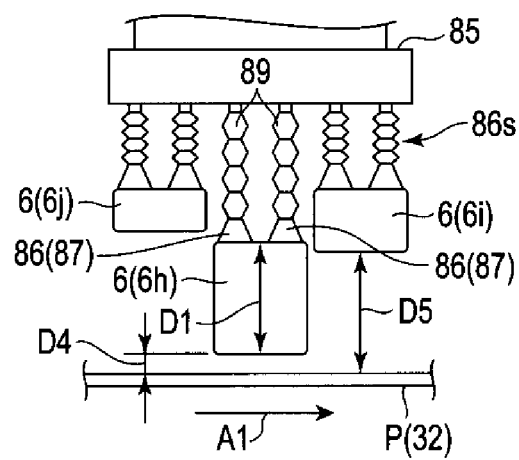
FIG. 22 is a schematic diagram illustrating a release condition in an article movement apparatus of a second embodiment.

The expansion and contraction portion 89 is expanded and contracted under the control of the control unit 9. For example, as illustrated in FIG. 22, the expansion and contraction portion 89 expands in a state in which the article 6 is attached by the suction disk 87. The expanded expansion and contraction portion 89 contracts (returns to its original state) when the article 6 is released from the suction disk 87. That is, the expansion and contraction portion 89 expands and contracts such that the article 6 held by the holding portion 86 can be raised and lowered with respect to the sorting area (cell) 32.

Furthermore, in the second embodiment, in addition to the separation distance between the article 6 held by the holding portion 86 of the robot arm 8 and the road surface (upper surface of the cell 32) of the conveyance path 31, the second detection unit 72 measures the height of the article 6 (hereinafter, referred to as an article height). The article height is a distance from the lowermost portion of the article 6 to the uppermost portion in a state of being held by the holding portion 86. For example, in the three articles 6 illustrated in FIG. 21, distances D1, D2, and D3 from the lower surface to the upper surface are measured as the article heights of articles 6h, 6i, and 6j.

Next, the operation and action of the article movement apparatus 2 of the second embodiment will be described in accordance with the control flow of the control unit 9 for the detection unit 7 and the robot arm 8. Similarly as in the first embodiment, the control unit 9 performs the holding process, holding state detection process, and moving process of the article 6 in order (see FIG. 7). Among the processes, the holding process and holding state detection process of the article 6 are the same as the holding process and the holding state detection process (FIGS. 8 and 9) in the first embodiment. In the moving process of the article 6, a new processing step is added to the moving process in the first embodiment.

Figure 23:
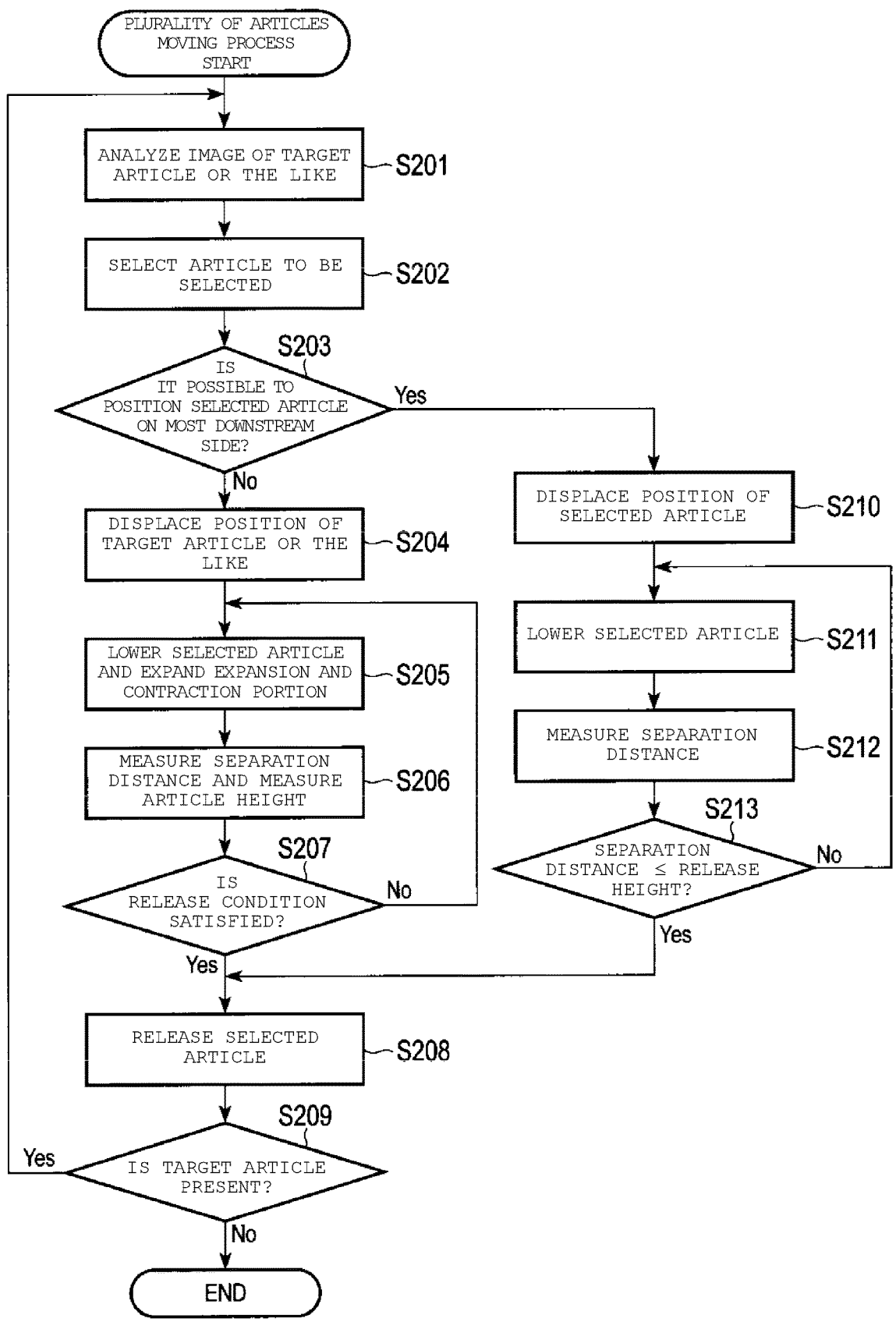
FIG. 23 is a control flow chart of a plurality-of-articles moving process performed by a control unit of an article movement apparatus according to a second embodiment.

The movement process of the article 6 in the second embodiment will be described. In the moving process of the article 6, in a case where the robot arm 8 does not hold the plurality of articles 6, the control unit 9 performs the same process (FIG. 10) as in the first embodiment. In a case where the robot arm 8 holds the plurality of articles 6, the control unit 9 performs a plurality-of-articles moving process illustrated in FIG. 23. FIG. 23 illustrates a control flow of the control unit 9 in the plurality-of-articles moving process.

As illustrated in FIG. 23, in the plurality-of-articles moving process, the control unit 9 causes the second detection unit 72 to measure the separation distance between the target article-and-the-like held by the robot arm 8 and the road surface (upper surface of the cell 32) of the conveyance path 31. In addition, the control unit 9 causes the article height of the target article-and-the-like to be measured. In this case, similar to S115 of the plurality-of-articles moving process in the first embodiment, the control unit 9 causes the second detection unit 72 to capture an image and analyze the captured image (S201). The second detection unit 72 analyzes the captured image and transmits data of the article height of the target article-and-the-like (hereinafter, referred to as a target article-and-the-like height data) is transmitted to the control unit 9, in addition to the separation state data of target article-and-the-like.

Based on the separation state data of target article-and-the-like transmitted from the second detection unit 72, the control unit 9 measures the separation distances between the target article-and-the-like and the upper surface of the cell 32, respectively, and selects the selected article (S202). The control here is the same as that of S116 and S117 of the plurality-of-articles moving process in the first embodiment. For example, in the case illustrated in FIG. 21, the control unit 9 selects the article 6h as the selected article.

Figure 21:
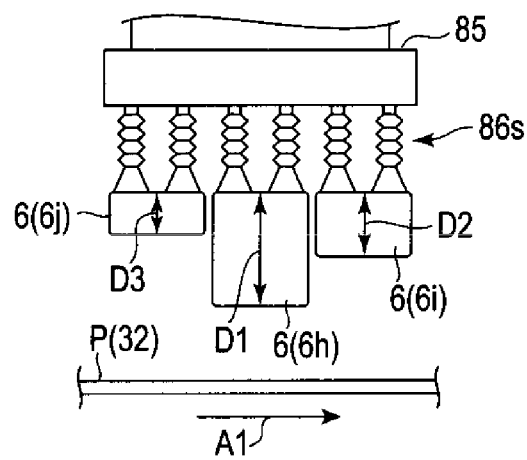
FIG. 21 is a schematic diagram illustrating the holding state of articles in a robot arm of an article movement apparatus of a second embodiment.

Subsequently, the control unit 9 determines whether or not the selected article is positioned on the most downstream side in a state where the target article-and-the-like is aligned in the conveyance direction A1 (X-direction illustrated in FIG. 19 is along the conveyance direction A1) (S203). In another way of achieving the matters described above, the control unit 9 determines whether or not an obstacle article exists. For example, as illustrated in FIG. 21, in a case where the target article-and-the-like are aligned along a predetermined direction and a selected article (article 6h) is sandwiched between other articles 6 (6i and 6j), when the target article-and-the-like is in a state of being aligned along the conveyance direction A1, the article 6i (obstacle article) other than the selected article is positioned on the most downstream side. Accordingly, in this case, the control unit 9 determines that the selected article cannot be positioned on the most downstream side.

In a case where it is determined that the selected article cannot be positioned on the most downstream side, the control unit 9 operates the arm portion 82 to move the target article-and-the-like (S204). Specifically, the control unit 9 rotates the end effector 85 around the sixth axis 84f so as to position the obstacle article on the downstream side of the conveyance direction A1 of the conveyance path 31 with respect to the other target articles including the selected article.

Subsequently, the control unit 9 causes the arm portion 82 to operate so that the selected article held on the holding portion 86 (suctioned by the suction disk 87) is lowered toward the upper surface of the cell 32, and expands the expansion and contraction portion 89 of the holding portion 86 (S205). For example, as illustrated in FIG. 22, the expansion and contraction portion 89 of the holding portion 86 holding the article 6h is expanded.

In this case, the control unit 9 measures the separation distance between the selected article and the obstacle article and the upper surface of the cell 32, respectively, based on the separation state data of target article-and-the-like transmitted from the second detection unit 72. Based on the target article-and-the-like article height data transmitted from the second detection unit 72, the control unit 9 measures the article height of the selected article (S206).

The control unit 9 determines whether or not (hereinafter, referred to as a release condition) the separation distance between the selected article and the upper surface of the cell 32 is equal to or less than the release height and the separation distance between the obstacle article and the upper surface of the cell 32 is larger than the article height of the selected article (S207). For example, in the state illustrated in FIG. 22, if a distance D4 is equal to or less than the release height and a distance D5 is larger than the distance D1, the release condition is satisfied. In this case, the article 6h is a selected article and the article 6i is an obstacle article.

In a case where it is determined that the release condition is satisfied, the control unit 9 causes the robot arm 8 to release the selected article (S208). In this case, the control unit 9 performs the same control as that of S113 of the plurality-of-articles moving process in the first embodiment for the selected article. In contrast, in a case where it is determined that the release condition is not satisfied, the control unit 9 repeats the control of S205 and S206 for the selected article until it is determined that the release condition is satisfied.

The control unit 9 performs the control from S201 and subsequent processing steps again (S209) until all target article-and-the-like are moved to the sorting area (cell) 32 of the conveyance path 31.

On the other hand, in a case where it is determined in S203 that the selection article can be positioned on the most downstream side, the control unit 9 performs control from S210 to S213 and S208 illustrated in FIG. 23. The control from S210 to S213 is the same as the control from S118 to S121 of the plurality-of-articles moving process in the first embodiment.

As such, in the second embodiment, the control unit 9 sequentially releases the article 6 from the holding portion 86 holding the article 6 of which the article height is the largest. With this, it is possible to move the article 6 from the accumulation area 60 to the sorting area (cell) 32 of the conveyance path 31 one by one from the article 6 of which the article height is the largest with a predetermined time difference. For example, if the article 6 is held as illustrated in FIG. 21, the article 6h of which the article height is the D1, the article 6i of which the article height is the D2, and the article 6j of which the article height is the D3 can be moved in this order.

According to the article movement apparatus-and-the-like according to the second embodiment, when the article 6 is moved to the cell 32, it is possible to reduce the separation distance between the article 6 and the upper surface of the cell 32, that is, to release the article 6 at a lower position. Accordingly, it is possible to further reduce impact on the article 6 when moving the article 6 to the cell 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In each of the embodiments and modification examples described above, a case where a form (size, shape, weight, packing state, and the like) of the article 6 is not uniform but may be various is assumed. In the case where the form of the article 6 is almost uniform, for example, only articles 6 having an outer shape that are substantially the same are to be moved, the process of selecting a particular article can be omitted. That is, in this case, the processing steps can be reduced.

In each of the embodiments and the modification examples described above, the article 6 is held by suction using the suction mechanism, but the mechanism that holds the article 6 is not limited thereto. For example, a gripping mechanism (hand-like mechanism) that grips the article 6 with two or more claws (or fingers) or a clamping mechanism that clamps an article between a fixed plate fixed in position and a movable plate separating from and contacting with the fixed plate.

In each of the embodiments and the modification examples described above, it is determined whether or not a plurality of articles 6 are being held by analyzing an image (or images) captured by the second detection unit 72. The method of determining whether or not multiple articles 6 are being held is not limited to such image analysis. For example, each holding portion 86 (suction disk 87) can be configured to be rotatable around an axis concentric with the opening 88. Then, when the holding portion 86 is rotated around the axis, it may be determined whether or not another holding portion 86 also rotates in the same direction accompanying the rotation of another holding portion 86 around the axis. When there exists another holding portion 86 that rotates together in the same direction, it can be determined that a plurality of articles 6 is being held.

What is claimed is:

1. An article movement apparatus, comprising:
    a first detection unit configured to detect positions and sizes of articles within an accumulation area;
    a robot arm including a holding portion group composed of a plurality of holding portions for releasably holding a plurality of articles, the robot arm configured to pick up articles from the accumulation area based on the position and size of the articles as detected by the first detection unit, and transfer the articles to a sorting cell of a conveyance path, the one or more articles in the sorting cell being moved along the conveyance path to a sorting area;
    a second detection unit configured to detect a holding state of articles on the robot arm and to measure a separation distance from each article being held by the robot arm to a surface of the sorting cell; and
    a control unit configured to control the first detection unit, the robot arm, and the second detection unit, wherein
    the robot arm includes a holding portion group composed of a plurality of holding portions for releasably holding articles, and
    the control unit is configured to select one article from the plurality of articles being held by the holding group portion of the robot arm to be released into the sorting cell before any other article in the plurality of articles being held by the holding group portion, the one selected article being selected according to a measured distance between a lower surface of the article and the surface of the sorting cell such that the selected article has the smallest measured distance amongst the plurality of articles being held by the holding group portion of the robot arm.

2. The article movement apparatus according to claim 1, wherein the control unit is configured to control the robot arm to position the selected article downstream of any other article of the plurality of articles prior to releasing the selected article to the sorting cell.

3. The article movement apparatus according to claim 2, wherein the holding portion group is rotated to position the selected article downstream of any other article in the plurality of articles.

4. The article movement apparatus according to claim 1, wherein the control unit is configured to select a second article from amongst the plurality of articles being held by the robot arm to be released to the sorting cell after the elapsing of a predetermined interval of time from the releasing of the first selected article to the sorting cell.

5. The article movement apparatus according to claim 1, wherein the first detection unit is a stereoscopic camera positioned above the accumulation area.

6. The article movement apparatus according to claim 1, wherein the holding portion includes an expansion and contraction portion capable of raising and lowering articles that are being held by the holding portion with respect to the surface of the sorting cell, and
    the control unit is configured to control the expansion and contraction portion to expand and lower articles before releasing articles to the surface of the sorting cell.

7. The article movement apparatus according to claim 1, wherein the control unit is configured to release a non-selected article from the plurality of articles back to the accumulation area after the one selected article has been selected.

8. The article movement apparatus according to claim 7, wherein the non-selected article is released back to the accumulation area before the one selected article is released to the sorting cell.

9. The article movement apparatus according to claim 1, wherein the control unit is configured to rotate the robot arm such that the selected article is placed downstream from all other articles in the plurality of articles being held by the robot arm before the selected article is released to the sorting cell.

10. An article movement method, comprising:
    detecting position and size of articles within an accumulation area;
    picking up one or more articles with a robot arm based on the detected position and size of articles within the accumulation area, and moving the articles to a sorting cell along a conveyance path;
    detecting a holding state of the one or more articles on the robot arm;
    measuring a distance from each article being held by the robot arm to a surface of the sorting cell; and
    controlling the robot arm to select one article from a plurality of articles being held by the robot arm to be released to the sorting cell before any other article of the plurality of articles being held, the one selected article being selected according to the measured distance between a lower surface of the selected article and the surface of the sorting cell such that the selected article has the smallest measured distance amongst the plurality of articles being held by the robot arm.

11. The article movement method according to claim 10, further comprising:
controlling the robot arm to position the selected article downstream of any other article of the plurality of articles being held by the robot arm prior to releasing the selected article to the sorting cell.

12. The article movement method according to claim 10, further comprising:
selecting a second article from amongst the plurality of articles being held by the robot arm to be released to the sorting cell after the elapsing of a predetermined interval of time from the releasing of the first selected article into the sorting cell.

13. The article movement method according to claim 10, further comprising:
lowering the robot arm such that a release height of the selected article above the surface of the sorting cell is less than a predetermined height.

14. The article movement method according to claim 10, wherein a stereoscopic camera is positioned above the accumulation area and is used for detecting the position and size of articles within the accumulation area.

15. The article movement method according to claim 10, wherein the holding state of the articles is detected using a camera positioned below a holding portion of the robot arm.

16. The article movement method according to claim 10, further comprising:
rotating a portion of the robot arm such that the one selected article is positioned on the conveyance path downstream of any other article of the plurality of articles being held by the robot arm, prior to the releasing of the selected article to the sorting cell.

17. A computer readable medium storing a program that when executed by a control unit of an article movement apparatus causes the article movement apparatus to perform an article movement method, comprising:
detecting a position and size of articles within an accumulation area;
controlling a robot arm to pick up one or more articles using the detected position and size of articles within the accumulation area;
detecting a holding state of the one or more articles picked up by the robot arm;
measuring a distance from each article being held by the robot arm to a surface of a sorting cell on a conveyance path; and
controlling the robot arm to select one article from a plurality of articles being held by the robot arm to be released to the sorting cell before any other article of the plurality of articles, the one selected article being selected according to the measured distance between a lower surface of the selected article and the surface of the sorting cell such that the selected article has the smallest measured distance of the plurality of articles being held by the robot arm.

18. The computer readable medium according to claim 17, wherein images from a stereoscopic camera are used in the detecting of position and size of articles within the accumulation area.

19. The computer readable medium according to claim 17, wherein the holding state is detected by referencing images obtained by a camera positioned below a holding group of the robot arm.

20. The computer readable medium according to claim 17, further comprising:
controlling the robot arm to position the selected article downstream of any other article of the plurality of articles being held by the robot arm on the conveyance path prior to releasing the selected article to the sorting cell.

* * * * *